J. H. REID.
ELECTRIC FURNACE.
APPLICATION FILED OCT. 16, 1909.
968,079. Patented Aug. 23, 1910.
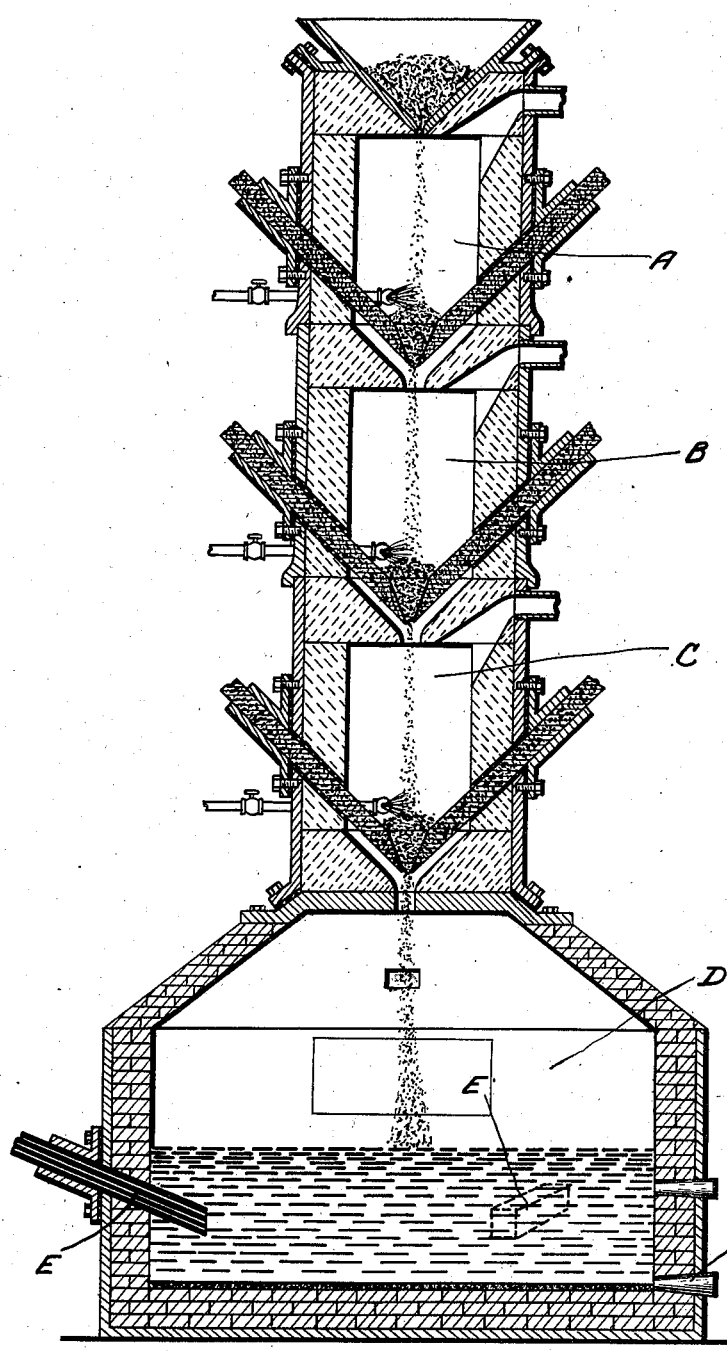
WITNESSES,
INVENTOR,
J. H. REID.
BY
ATT'Y.

UNITED STATES PATENT OFFICE.

JAMES HENRY REID, OF NEWARK, NEW JERSEY.

ELECTRIC FURNACE.

968,079.

Specification of Letters Patent. Patented Aug. 23, 1910.

Application filed October 16, 1909. Serial No. 523,079.

*To all whom it may concern:*

Be it known that I, JAMES HENRY REID, of Newark, in the State of New Jersey, United States of America, have invented certain new and useful Improvements in Electric Furnaces, of which the following is a specification.

My invention relates to improvements in electric furnaces, and the objects of my invention are to provide means for more completely treating and refining the ore, and metal passing through a continuously discharging electric furnace; and it consists essentially of the combination with a continuously discharging electric furnace, of a charge and tap electric furnace adapted to receive the discharge therefrom, in which the discharged material may be further treated, all as hereinafter more fully set forth and described in the accompanying specifications and drawings.

The drawing shows a vertical section through the furnace.

In an earlier Patent No. 900,207, I have described a form of electric furnace which discharges continuously a stream of treated material. In certain cases, it is found desirable to treat further, the material discharging in order to further refine the metal, and this treatment can be most advantageously carried out in a furnace of the charge and tap type. For instance, if iron ore be passed through the first furnace, by a further treatment in a furnace of the charge and tap type, steel can be produced. According to the present invention, this stream of ore discharging from a series of furnaces, such as illustrated in my aforesaid patent, discharge into a settling tank, having means associated therewith for electrically heating the same.

In the drawings, A, B and C represent the chambers of an electric furnace, such as described in my earlier Patent No. 900,207. If desired, only one chamber may be employed, and the form and shape of these chambers are to be considered as illustrative only so far as regards the present invention. Immediately below the discharge opening in the last chamber, a tank D is provided adapted to receive the discharging material and provided with suitable tap holes 10 and 11, for the metal and slag respectively. This tank is provided with means for electrically heating the contents, the means illustrated comprising inclined electrodes E of usual form. These electrodes preferably extend into the charge in substantially the plane of division between the metal and slag, whereby they may be employed to heat either the metal or the slag or both. This may be accomplished by inserting the electrodes a considerable distance into the charge when it is desired to have the whole proportion heated and only a short distance when it is desired to heat the slag alone.

In operation, taking as an example, an iron ore, the ore is brought to a finely divided state, and passed through the chambers A, B and C, being suitably treated therein to effect a reduction of the ore, the discharging products from the last chamber being slag and iron. Upon a further treatment by the electrodes in the tank D, the impurities in the iron are eliminated and the same is converted into steel, which may be tapped out through the hole 10.

The furnace above described will be found of particular adaptability for the smelting of flue dust and other ores which are finely comminuted. When used for this purpose, the lower chamber is preferably provided with a bed of coke dust or anthracite dust and a certain amount of coke dust or anthracite dust may be allowed to float on the charge to protect the metals and to carbonize the charge and to deoxidize any of the charge carrying oxids.

What I claim as my invention is:—

1. The combination with a plurality of chambers through which the ore is adapted to pass by gravity, each chamber having means for withdrawing the volatile products, of a receptacle for the material discharged from said chambers having electric heating means associated therewith.

2. The combination with a plurality of heating chambers each having means for producing an arc centrally therein and means for withdrawing the volatile products therefrom, of a receptacle for the material discharged from the lowermost chamber having electric heating means associated therewith.

3. The combination with an electric heating chamber having a plurality of electrodes extending through the walls thereof to substantially the center, said electrodes producing a central arc within the furnace out of contact with the walls and through which the material being treated is adapted to pass by gravity, said chamber also having means for withdrawing the volatile products therefrom, of an electric furnace of the charge and tap type adapted to receive the discharging material from the said chamber.

In witness whereof I have hereunto set my hand in the presence of two witnesses.

JAMES HENRY REID.

Witnesses:
RUSSEL S. SMART,
MARY C. LYON.